United States Patent
Tuski

(10) Patent No.: US 7,647,823 B2
(45) Date of Patent: Jan. 19, 2010

(54) SENSOR FOR AN ENGINE MANIFOLD WITH SHIELDED SENSING COMPONENT

(75) Inventor: Chris Edward Tuski, Lapeer, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/119,103

(22) Filed: May 12, 2008

(65) Prior Publication Data

US 2009/0277257 A1 Nov. 12, 2009

(51) Int. Cl.
*G01F 15/00* (2006.01)

(52) U.S. Cl. .................................. 73/114.37

(58) Field of Classification Search . 73/114.31–114.34, 73/114.37
See application file for complete search history.

(56) References Cited

U.S. PATENT DOCUMENTS

| | | | | |
|---|---|---|---|---|
| 4,210,016 A * | 7/1980 | Peter et al. | ............... | 73/114.34 |
| 4,472,965 A * | 9/1984 | Knapp et al. | ............... | 73/114.34 |
| 4,742,711 A * | 5/1988 | Porth et al. | ............... | 73/114.34 |
| 4,759,213 A * | 7/1988 | Porth et al. | ............... | 73/114.32 |
| 4,974,445 A * | 12/1990 | Arai et al. | ................. | 73/114.34 |
| 4,981,035 A * | 1/1991 | Hall | ......................... | 73/114.32 |
| 5,253,517 A * | 10/1993 | Molin et al. | .............. | 73/114.32 |
| 5,303,584 A * | 4/1994 | Ogasawara et al. | ...... | 73/204.21 |
| 6,185,998 B1 * | 2/2001 | Yonezawa et al. | ......... | 73/114.34 |
| 7,043,991 B2 * | 5/2006 | Peng et al. | ..................... | 73/700 |
| 2004/0186653 A1 * | 9/2004 | Bleile et al. | ................. | 701/103 |
| 2008/0202224 A1 * | 8/2008 | Dingl et al. | .............. | 73/114.37 |
| 2008/0236267 A1 * | 10/2008 | Hartmann et al. | ......... | 73/114.37 |
| 2008/0302173 A1 * | 12/2008 | Saito et al. | ............... | 73/114.33 |

* cited by examiner

*Primary Examiner*—Lisa M Caputo
*Assistant Examiner*—Freddie Kirkland, III
(74) *Attorney, Agent, or Firm*—Quinn Law Group, PLLC

(57) ABSTRACT

A sensor for an engine manifold is provided that includes a sensing component positioned within the engine manifold and responsive to a condition, such as temperature or pressure, within the engine manifold. The sensor includes a shield partially surrounding the sensing component upstream of the sensing component in flow within the manifold, which includes exhaust gases and manifold intake air. The shield does not surround a downstream side of the sensing component. The shield minimizes contamination of the sensing component by contaminants within the exhaust gases or manifold intake air, without compromising responsiveness of the sensing component to changes in the sensed condition, as the sensing component is still directly open to the manifold air (i.e., the exhaust gases and intake air).

10 Claims, 2 Drawing Sheets

SENSOR FOR AN ENGINE MANIFOLD WITH SHIELDED SENSING COMPONENT

TECHNICAL FIELD

The invention relates to a sensor for an engine manifold having a sensing component positioned in the manifold with a shield partially surrounding the sensing component upstream of the component.

BACKGROUND OF THE INVENTION

Exhaust gas recirculation is used to allow a controlled amount of oxygen depleted exhaust gas to be mixed with intake air flowing to an engine for combustion in the cylinders of the engine. The engine manifold also typically includes sensors for sensing manifold pressure, manifold air temperature, or both, or for sensing other manifold conditions. Particulate and other contaminants in the recirculated air tend to buildup on the sensors, reducing their efficiency and accuracy. The sensing elements of some sensors have been encased to address this problem; however, encasing the sensing element may reduce its responsiveness to changing manifold conditions.

SUMMARY OF THE INVENTION

A sensor for an engine manifold is provided that includes a sensing component positioned within the engine manifold and responsive to a condition within the engine manifold, such as temperature or pressure. For example, the sensor may be a manifold air pressure (MAP) sensor and the sensing component may be a pressure port. Alternatively, the sensor may be a temperature manifold air pressure sensor (TMAP), and the sensing component may be a temperature sensing element. Still alternatively, the sensor may be simply a temperature sensor, with the sensing component being a temperature sensing element.

The sensor also includes a shield partially surrounding the sensing component upstream of the sensing component in flow within the manifold. The shield does not surround a downstream side of the sensing component. The shield minimizes contamination of the sensing component by contaminants within the exhaust gas and intake air, without compromising responsiveness of the sensing component to changes in the sensed condition, as the sensing component is still directly open to the manifold air.

The sensor may include a sensor body from which the sensing component and the shield extend in a common direction. A gap is defined between the sensing component and the shield. The gap allows manifold air to surround the sensing component, thereby increasing responsiveness of the sensing component to the sensed condition.

The sensor may be part of an engine assembly, such as a diesel engine assembly, in which the intake manifold is operatively connected to an engine block for providing air for combustion within an engine cylinder defined by the engine block. The engine assembly also includes an exhaust gas recirculation system that routes engine exhaust from the engine cylinder to the intake manifold. The sensing component may be configured to sense and generate a sensor signal that is correlated with the sensed condition within the intake manifold. The sensor signal is sent to an electronic controller which controls the engine assembly based at least in part on the sensed condition.

Thus, by shielding the upstream side of the sensing component, contaminants in the exhaust gases and intake manifold air are blocked from direct impingement on the sensor component. Furthermore, because the shield does not surround the downstream side of the sensor component, the sensor component is exposed to the manifold air (i.e., the intake manifold air and the exhaust gases) and can respond in an efficient and timely manner to changing sensed conditions.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
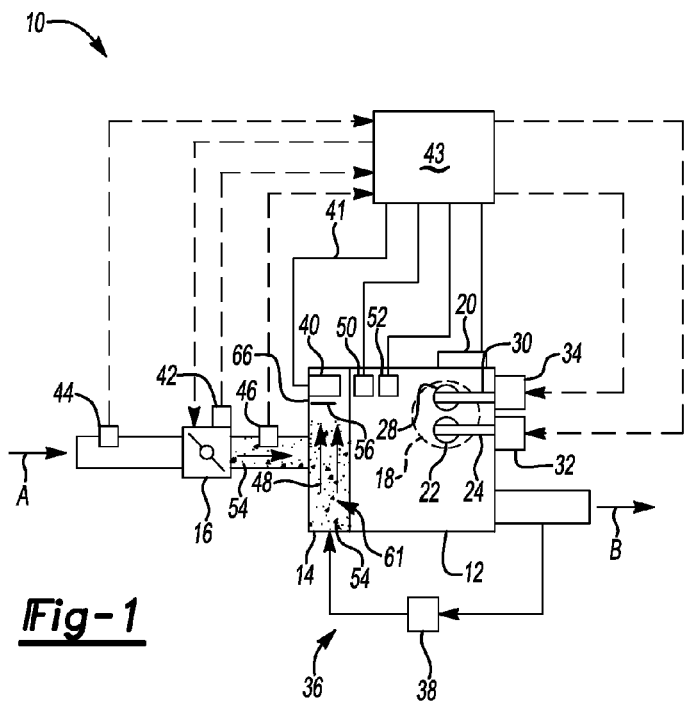
FIG. 1 is a schematic illustration of an engine assembly including a manifold sensor.

Referring to the drawings, wherein like reference numbers refer to like components, an engine assembly 10 is illustrated that includes an engine, represented in part by an engine block 12. Air (represented by arrow A) is drawn into an intake manifold 14 through a throttle 16. The intake manifold 14 is connected with the engine block 12. The throttle 16 regulates mass air flow into the intake manifold 14. Air within the intake manifold 14 is distributed into cylinders 18 (only one shown) that are formed or machined in the cylinder block 12.

The engine assembly 10 includes an intake valve 22 that selectively opens and closes to enable the air/fuel mixture to enter the cylinder 18. The intake valve position is regulated by an intake camshaft 24. A piston (not shown) compresses the air/fuel mixture within the cylinder 18. The piston drives the crank shaft (not shown) to produce drive torque. Combustion exhaust within the cylinder 18 is forced out of an exhaust port when an exhaust valve 28 is in an opened position. The exhaust valve position is regulated by an exhaust camshaft 30. Although only a single intake and exhaust valve 22, 28, respectively, are illustrated connected with the cylinder 18, multiple intake and exhaust valves may be used per cylinder.

The engine assembly 10 may include an intake cam phaser 32 and exhaust cam phaser 34 that respectively regulate the rotational timing of the intake and exhaust camshafts 24, 30.

The engine assembly 10 also includes an exhaust gas recirculation EGR system 36. The remainder of exhaust flow, labeled B, is exhausted from the engine. The EGR system 36 includes an EGR valve 38 that regulates a portion of exhaust flow back into the intake manifold 14. The EGR system is generally implemented to regulate emissions.

Functioning of the engine assembly 10, such as opening and closing of the intake and exhaust valves 22, 28 and positioning of the throttle 16, is at least partly controlled by the electronic controller 43, also referred to as a control module. The electronic controller 43 responds to a sensor signal 41 received from a manifold sensor 40. The electronic controller 43 also responds to sensor signals received from a throttle position sensor 42, an intake air temperature sensor 44, an engine coolant temperature sensor 50, and an engine speed sensor 52. The intake air temperature sensor 44 is responsive to a temperature of the intake air (indicated flowing in the direction of the arrow under the mass airflow sensor 46 in FIG. 1) and generates an intake air temperature signal. The mass airflow sensor 46 is responsive to the mass of the intake airflow and generates a mass airflow signal. The engine coolant temperature sensor 50 is responsive to a coolant temperature and generates an engine temperature signal. An engine speed sensor 52 is responsive to a rotational speed of the engine and generates an engine speed signal. Each of the signals generated by the sensors 40, 42, 44, 46, 50, 52 is received by the control module 43. The control module 43 also regulates a fuel injection system 20, the camshaft phasers 32, 34, and the EGR system 36.

The manifold sensor 40 is responsive to a condition within the intake manifold 14 associated at least in part with manifold airflow 48, and generates the sensor signal 41. The recirculated exhaust gas in the EGR system enters the manifold 14 and flows in a direction indicated by arrows representing airflow 48 toward the manifold sensor 40.

It should be appreciated that the manifold sensor 40 may be a manifold air pressure MAP sensor, a temperature and manifold air pressure TMAP sensor, a manifold temperature sensor, or any other type of sensor sensing a condition within the manifold 14.

Contaminates 54 enter into the intake manifold 14 with the intake air and the recirculated exhaust gases and are carried toward the manifold sensor 40 in the direction of flow 48 within the manifold. The contaminants 54 may be, for example, exhaust gas particulate, oil pullover, water/ice or other impurities. To prevent the build up of contaminates 54 on an operative sensing component of the sensor 40, the sensor 40 is configured with a shield 56 in an upstream position with respect to the sensing element, as shown and described in detail with respect to FIG. 2A.

Figure 2A:
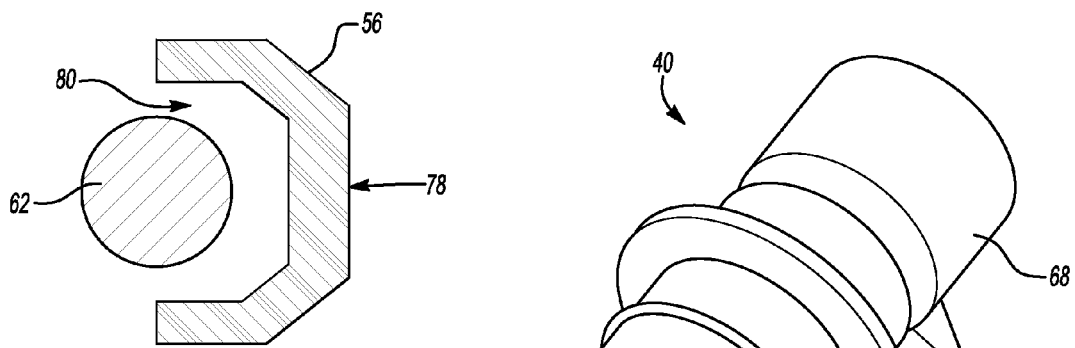
FIG. 2A is a schematic perspective illustration of the manifold sensor of FIG. 1.

Referring to FIG. 2A, one embodiment of the manifold sensor 40 is shown that is a TMAP sensor. The manifold sensor 40 has a sensor body 60 from which both the shield 56 and a sensing component 62 extend. The sensor body 60 has a flange 64 configured to abut a wall 66 (see FIG. 1) of the manifold 14, with the sensing element 62 and shield 56 extending through an opening in the wall 66 in a common direction, generally perpendicular to the flow 48 shown in FIG. 1. Electronics within an upper portion 68 of the body 60 relay the signal 41 (see FIG. 1) to the electronic controller 43, as is known. In this embodiment, the sensing element 62 senses a temperature of the manifold cavity 61 of FIG. 1.

Figure 2B:
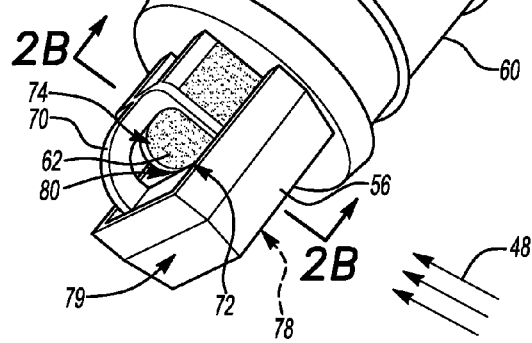
FIG. 2B is a schematic cross-sectional illustration of the manifold sensor and shield of FIG. 2A taken at the arrows 2B in FIG. 2A.
Figure 3:
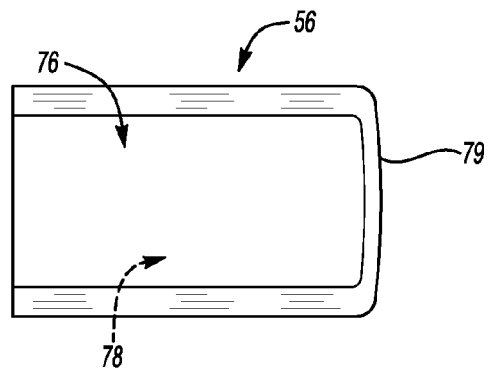
FIG. 3 is a schematic side view illustration of a shield of the manifold sensor of FIG. 2A, with the shield rotated with respect to FIG. 2A.

The sensing component 62 is supported by support structure 70. The shield 56 partially surrounds the sensing component 62 on an upstream side 72 thereof. A downstream side 74 of the sensing component 62 is not surrounded by the shield 56. As shown in FIG. 3, the shield 56 is a generally concave component defining a partial cavity 76 which opens toward the sensing component 62 and has a back surface 78 that faces the flow 48. An end 79 protects the sensing component 62 from a direction perpendicular to the flow 48. There is a gap 80 between the shield 56 and the downstream side 74 of the sensing component 62. The gap 80 extends along the length of the sensing component 62 within the concave shield 56, as best illustrated in FIG. 2B, in which the support structure 70 and body 60 are removed for clarity. Thus, the entire sensing component 62 is open to the manifold cavity 61 of FIG. 1, and is not encased within (i.e., is not completely surrounded by) the shield 56.

Figure 4:
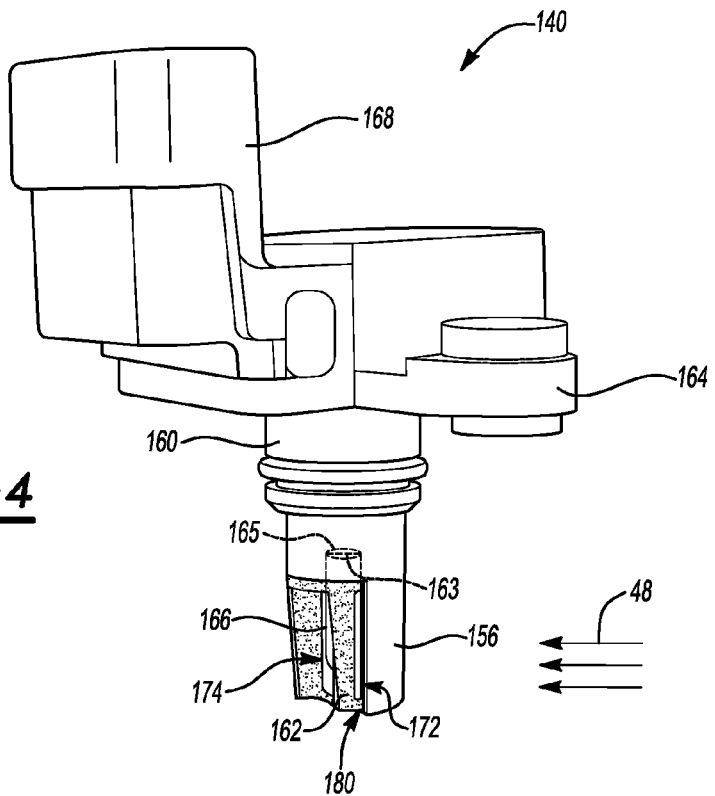
FIG. 4 is a schematic perspective illustration of an alternative embodiment of a manifold sensor for use in the engine assembly of FIG. 1.

Referring to FIG. 4, another embodiment of a sensor 140 that may be used in place of sensor 40 of FIGS. 1 and 2A is illustrated. The sensor 140 is a TMAP sensor. The sensor 140 has a sensor body 160 from which both the shield 156 and a sensing component 162 extend. The sensor body 160 has a flange 164 configured to abut the wall 66 of FIG. 1 with the sensing component 162 and shield 156 extending in a common direction through an opening of the wall 66 (see FIG. 1) of the manifold 14, generally perpendicular to the flow 48 shown in FIG. 1. Electronics within an upper portion 168 of the body 160 relay the signal 41 (see FIG. 1) to the control module 43. In this embodiment, the sensing component 162 senses a temperature of the manifold cavity 61 of FIG. 1. The sensor 140 also has a pressure sensing component 163 within a pressure port 165 located above the temperature sensing component 162 and in communication with a larger port area 166.

Figure 5:
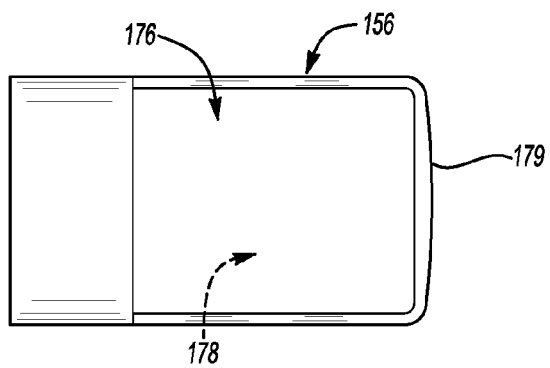
FIG. 5 is a schematic side view illustration of a shield of the manifold sensor of FIG. 4, with the shield rotated with respect to FIG. 4.

The shield 156 partially surrounds the sensing component 162 on an upstream side 172 thereof. A downstream side 174 of the sensing component 162 is not surrounded by the shield 156. Referring to FIG. 5, the shield 156 is a generally concave component defining a partial cavity 176 which opens toward the sensing component 162 of FIG. 4 and has a back surface 178 that faces the flow 48 of FIG. 1. An end 179 protects the sensing component 162 from a direction perpendicular to the flow 48. As illustrated in FIG. 4, there is a gap 180 between the shield 156 and the downstream side 174 of the sensing element 162. The gap 180 extends along the length of the sensing element 162 within the concave shield 156 (i.e., gap 180 is substantially similar to gap 80 of FIG. 2B). Thus, the entire sensing component 162 is open to the manifold cavity 61 of FIG. 1, and is not encased within the shield 156. The pressure port 165 is also open to the manifold cavity 61 of FIG. 1 via the larger port area 166, and is not encased by the shield 156.

While the best modes for carrying out the invention have been described in detail, those familiar with the art to which this invention relates will recognize various alternative designs and embodiments for practicing the invention within the scope of the appended claims.

The invention claimed is:

1. A sensor for an engine manifold into which manifold intake air and recirculated exhaust gases flow, comprising:
   a sensor body mounted in the manifold;
   a sensing component extending from the sensor body, positioned within the engine manifold, and responsive to a condition within the engine manifold;
   a shield extending from the sensor body upstream of the sensing component in the flow, having a surface facing the flow and an end extending downstream from the surface to partially define a cavity within the shield in which the sensing component is positioned; and wherein the end partially surrounds the sensing component to thereby minimize contamination of the sensing component without compromising responsiveness of the sensing component to changes in the condition.

2. The sensor of claim 1, wherein the sensor is a manifold air pressure sensor and the sensing component is a pressure port.

3. The sensor of claim 1, wherein the sensor is a temperature manifold air pressure sensor and the sensing component is a temperature sensing element.

4. The sensor of claim 1,
wherein the sensing component and the shield extend from the sensor body in a common direction and are spaced from one another to define a gap between the shield and the sensing component.

5. An engine assembly comprising:

an engine block defining an engine cylinder;

a manifold connected to the engine block and defining a manifold cavity in selective fluid communication with the engine cylinder;

an exhaust gas recirculation system routing exhaust gas from the engine cylinder to the manifold;

a sensor positioned in the manifold and having a sensing component operable for sensing a condition within the manifold;

an electronic controller operable for controlling the engine assembly based at least in part on the sensed condition; wherein the sensor is operable for sending a sensor signal to the electronic controller correlating with the sensed condition;

wherein the sensor has a shield upstream of the sensing component in flow within the manifold cavity to protect the sensing element from contaminants in the flow; and a sensor body; wherein the sensing component and the shield extend from the sensor body in a common direction generally perpendicular to flow within the manifold cavity, and are spaced from and not in contact with one another to define a gap between the shield and the sensing component; wherein the shield only partially surrounds the sensing component to permit the sensing component to be exposed to the manifold cavity.

6. The sensor of claim 5, wherein the sensor is a manifold air pressure sensor and the sensing component is a pressure port.

7. The sensor of claim 5, wherein the sensor is a temperature manifold air pressure sensor and the sensing component is a temperature sensing element.

8. An engine assembly comprising:

an air intake manifold;

a sensor positioned in the air intake manifold and having a sensing component configured to sense and generate a sensor signal correlated with a condition within the intake manifold; wherein the sensor has a concave shield positioned upstream in flow within the manifold in relation to the sensing component and defining a cavity in which the sensing component is positioned such that the shield shields the sensing component from the flow on an upstream side of the sensing component without shielding a downstream side of the sensing component.

9. The engine assembly of claim 8, wherein the sensor is one of a manifold air pressure sensor and a temperature manifold air pressure sensor.

10. The engine assembly of claim 8, wherein the sensing component is a first sensing component operable to sense temperature within the manifold, and further comprising:

a second sensing component operable to sense pressure and also positioned within the cavity defined by the shield.

* * * * *